United States Patent [19]

Hescher

[11] 3,763,327

[45] Oct. 2, 1973

[54] MAGNETIC HEAD WHEEL ROTOR AND TRANSFORMER ASSEMBLY WITH ANTI-ROTATION LOCKING MEANS

[75] Inventor: Manfred Hescher, Weiterstadt, Germany

[73] Assignee: Fernseh GmbH, Am Alten Bohnhof, Germany

[22] Filed: Aug. 4, 1971

[21] Appl. No.: 168,834

[30] Foreign Application Priority Data

Aug. 5, 1970 Germany .................. P 20 38 893.6

[52] U.S. Cl. .......................................... 179/100.2 T

[51] Int. Cl. ............................................ G11b 5/52

[58] Field of Search ............................ 179/100.2 T; 336/120

[56] References Cited

UNITED STATES PATENTS

| | | | |
|---|---|---|---|
| 3,591,732 | 7/1971 | Prochnow | 179/100.2 T |
| 3,531,749 | 9/1970 | Tveter et al. | 336/120 |
| 3,179,909 | 4/1965 | Cheney | 179/100.2 T |

*Primary Examiner*—Bernard Konick
*Assistant Examiner*—Robert S. Tupper
*Attorney*—Ernest F. Marmorek

[57] ABSTRACT

A device for recording signals on a magnetic tape or for reproducing signals therefrom of the type where a rotating head wheel is provided with at least one magnetic pick-up head. Such a device requires a signal repeater or transformer including a fixed and a rotating magnetic core interconnected by associated coils. The fixed part of the device including the fixed magnetic cores is normally fixed against rotation but may be unlocked to permit rotation so that the fixed portion of the device may be rapidly removed and exchanged. Further, the fixed portion of the device including the fixed magnetic cores is disposed about the rotating portion to facilitate removal thereof. This makes it possible to exchange the coils between associated pairs of magnetic cores to change the transformer ratio or to change the fixed portion of the device to permit reproducing or recording signals for optimum performance.

4 Claims, 4 Drawing Figures

Inventor:
Manfred Hescher,
by
[signature],
His Attorney.

Inventor:
Manfred Hescher,
by
[signature]
His Attorney.

MAGNETIC HEAD WHEEL ROTOR AND TRANSFORMER ASSEMBLY WITH ANTI-ROTATION LOCKING MEANS

BACKGROUND OF THE INVENTION

Reference is had to the U.S. Pat. No. 3,591,732.

This invention relates generally to a device for recording signals on a magnetic tape-like recording medium or for reproducing signals therefrom, and particularly relates to such a device having a rotating head wheel provided with at least one magnetic pick-up head and including a repeater or transformer for transmitting the signals between the rotatable and the fixed portions of the device.

It is already known for recording and reproducing signals particularly of wide-band video signals on magnetic tape-like recording media to provide magnetic pick-up heads disposed at the circumference of rotating head wheels. These pick-up heads record closely adjacent traces on the tape which form an angle with the direction of movement of the tape. The drive of the head wheel is usually an electric motor, and the rotor of the motor and the head wheel usually have a common bearing. In view of the necessary great smoothness of rotation, the high number of revolutions, the required great precision of adjustment of the control device for controlling the number of revolutions and the avoidance of electric interference, it is conventional practice to use air bearings for both the axial and the radial bearings. This insures that during operation there is no mechanical contact between the rotating and the fixed parts.

In order to transmit the signals from the rotatable head wheel to the fixed portion of the device one has initially used sliding ring contacts with contact brushes or else mercury contacts. Such contacts, however, are not free of maintenance problems and are subject to failure and interference, so that today inductive repeaters or transformers are used almost exclusively.

Such inductive repeaters include annular magnetic cores which are disposed in pairs and concentric and closely adjacent to each other whereby one core is secured to the rotatable portion and the associated core is secured concentric thereto on the fixed portion of the device. Each pair of annular cores transmits the signals of a magnetic pick-up head, each of the annular cores having a coil for the inductive transmission of the signals.

The invention relates to a repeater of this type.

In the known device the fixed portion of the repeater is carefully worked, shaped, adjusted and connected with the device by screws, locating or set pins or fitting surfaces. In view of the unavoidable tolerances during manufacture and the assembly of all the parts it is not possible for the known repeater to maintain a small air gap between the associated concentric annular magnetic cores required to provide the greatest possible usable signal.

In view of the small permissible tolerances the repeater cannot readily be exchanged so that in case of damage the entire head wheel unit consisting of a base plate, head wheel motor with head wheel disk, magnetic heads, head shoe guidance, control track head, impulse generator and so on must be returned to the manufacturer. This requires to maintain at all times an expensive inventory, and beyond that the provision of entire replacement machines because the exchange of the head wheel unit requires considerable time on account of the necessary adjustments.

For the failure-free recording and reproducinG of signals particularly at high frequencies an intimate contact between the magnetic tape and the recording or reproducing magnetic pick-up head is required. In view of the high relative velocity between the magnetic tape and the magnetic heads during recording and reproducing particularly of video signals, relatively rapid wear of the magnetic heads is experienced. At this time an average life of the magnetic heads of about 200 hours is assumed. In view of different causes this lifetime may also be appreciably shorter. The failure of one head, for example, out of four heads is sufficient to necessitate the exchange of the head wheel.

According to a previous proposal embodied in an invention as described in the aforementioned U.S. Pat. No. 3,591,732 assigned to the assignee of the present application this exchange is much facilitated when the diameters of the radial bearings of the head wheel shaft are so adjusted that the completely mounted rotor may be inserted from the side of the head disk into the stator and the fixed portion of the repeater. In this case almost no adjustment is necessary. However, the air gap in the repeater must have a certain size to permit the friction-less exchange of the head wheel shaft.

It is accordingly an object of the invention to provide a device of the type discussed which has a higher efficiency for recording and reproducing signals, particularly of video signals.

Another object of the invention is to provide such a device which is characterized by an easier and more rapid exchange of the fixed or stationary parts of the device.

A further object of the invention is to provide a device for recording and reproducing signals on a magnetic tape which avoids the drawbacks of known devices.

SUMMARY OF THE INVENTION

In accordance with the present invention these objects are achieved in that the fixed portions of the repeater are connected to the fixed portion of the device secure against rotation but are freely rotatable on the rotatable portion of the repeater.

The advantage of such an arrangement consists primarily in that the air gap between the fixed and the rotating portions of the repeater can be reduced to a fraction of the presently possible value in view of the fact that assembly tolerances can be dispensed with.

A particularly advantageous embodiment of the invention is obtained when the bearing of the fixed portion of the repeater on the rotatable portion is an air bearing. In this case an air cushion may separate the relatively movable parts from each other. In view of the lack of any vibration due to bearing friction and imperfections of the bearing, the air gap can be made particularly small so that an appreciable gain of the voltage is obtained compared to that of the known arrangements with repeaters which are fixed by screws.

Another essential advantage of the invention is that the rotating as well as the fixed portions of the repeater may be rapidly exchanged without adjustment. In this manner it is possible to accommodate the repeater to individual operating conditions or else to changed operating conditions. For example, for new head wheels or those provided with new magnetic heads the output voltage is substantially smaller in view of the initially greater depth of the slit of the magnetic heads compared to that after they have been operated for about 25 hours. Also, the interference distance during the first portion of the life of the magnetic head is worse than after a certain operating time. It has been proposed to obviate this drawback by initially running-in the finished head wheels against particularly rough magnetic tapes. This measure, however, further reduces the already short operating life of the magnetic heads.

However, it is feasible to reduce this running-in time or to obviate it entirely when the weaker output voltage of a new magnetic head is compensated by a correspondingly changed ratio of the coils of the associated repeater. With a device according to the invention the exchange of the fixed portion of the repeater offers no difficulties and takes only a few seconds. After the output voltage has risen to its nominal value the repeater may easily be exchanged for another having the nominal ratio of the transformer coils. Similarly for a device according to the invention separate repeaters may advantageously be used for the recording and for the reproducing of signals, each repeater having optimal characteristics for its intended use.

A further essential advantage of the invention is that the air bearing of the repeater is self-centering and offers an effective protection against mechanical contact of the relatively moving parts. In the past accidental contact of the fixed portion of the repeater often caused damage or destruction of both parts of the repeater when they touch each other at a high number of revolutions due to elastic deformation. By the direct mounting of the repeater elements, one inside the other, by means of a bearing capable of carrying high loads, particularly by an air bearing, this danger is entirely eliminated.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
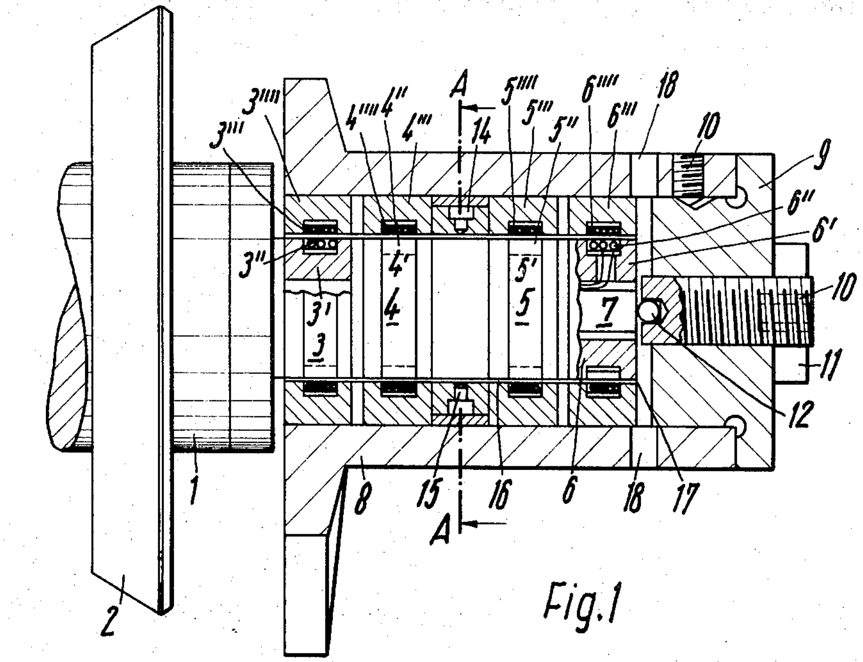
FIG. 1 is a longitudinal section of an embodiment of the device according to the invention.

As shown in FIG. 1 there is provided a head wheel shaft 1 carrying a head wheel 2 on which may be mounted one or more magnetic pick-up heads (not shown). The rotatable portions 3, 4, 5, 6 of the repeater or transformer are disposed along an axial extension of the shaft 1. Each rotatable part of the repeater consists of an annular magnetic core 3'. 4', 6' and an associated coil 3'',4'', 5'', 6'', each coil being disposed in a suitable annular recess of the associated core. Each coil is connected by leads (as indicated at core 6) with a respective magnetic pick-up head. The fixed portions of the repeater which are arranged concentric to the rotatable portions consist essentially of the annular magnetic cores 3''', 4''', 5''', 6''' and the transformer coils 3'''', 4'''', 5'''', 6'''' which are disposed in corresponding annular spaces in the associated cores. The rotatable portions of the repeater are interconnected by the shaft 7 to form a unit and correspondingly the fixed portions of the repeater are interconnected by the cylindrical sleeve 8. The sleeve 8 is provided with a head portion 9 which is fixed by screws 10 with the sleeve 8. Along the central axis of the head portion 9 there is provided an adjustment screw 10 with a locking nut 11. At the tip of the adjustment screw 10 there is disposed in a suitable recess a ball 12 which presses against the right-hand face of the shaft 7 and permits axial adjustment in one direction.

Figure 2:
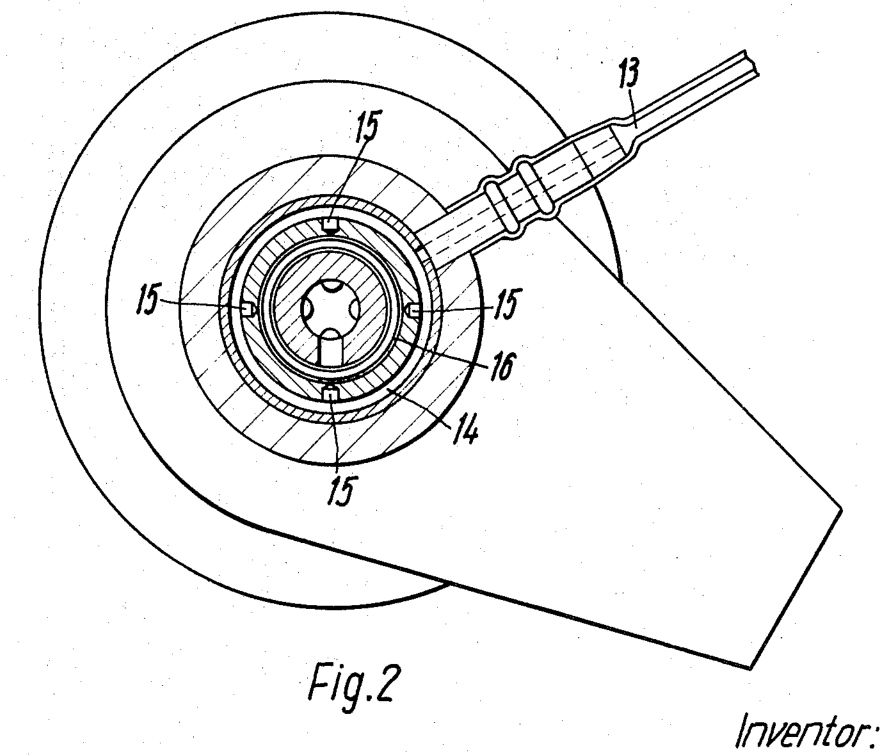
FIG. 2 is a cross-sectional view, taken on line A—A of FIG. 1.
Figure 3:
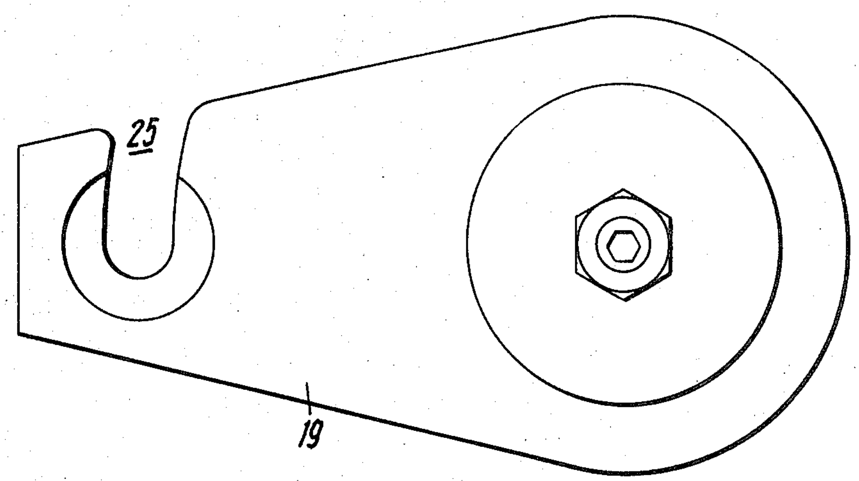
FIG. 3 is a plan view of an embodiment of a torsional moment support.
Figure 4:
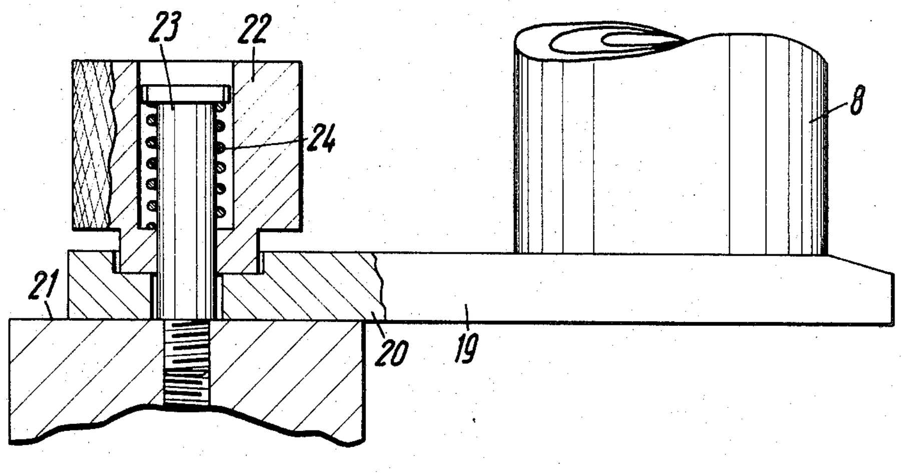
FIG. 4 is a side elevational view, partly in section, of an exemplary embodiment of mounting the torsional moment support of FIG. 3.

By means of a compressed air conduit 13 as shown in FIGS. 1 and 2 compressed air is fed into an annular channel 14 in the fixed portion of the repeater. From channel 14 the air is fed by means of nozzles 15 which are uniformly distributed along the circumference into the bearing gap 16. The highly compressed air prevents the metallic contact of the relatively moving parts. The air may escape by means of the flat end faces, the channel 17 and the bores 18 into the ambient air.

For the purpose of rapidly exchanging the fixed portion of the repeater there may be provided a torsional moment support 19 which is preferably so arranged that one of its surfaces 20 bears against a smooth surface 21 of the device. By means of the locking element 22 the support 19 is pressed with a predetermined force against the surface 21. The locking element 22 is axially movably disposed on a bolt 23 and is pressed by the force of a spring 24 against the support 19. The support 19 is preferably provided with a radial slot 25 which permits a rapid and easy exchange of the sleeve 8 with the fixed repeater portions mounted thereon.

As pointed out before, it is feasible to provide respective coils such as 3'' and 3'''' with varying transformer ratios depending on different operating conditions. For example, a higher transformer ratio may be provided for new magnetic heads, and after the output voltage increases, a new repeater may be used with a normal transformer ratio.

Also it is readily possible to exchange the fixed portions of the repeater so that a different repeater or transformer may be provided for recording and reproducing signals, each being of optimum design for its intended purpose.

All this is made possible because the fixed portions of the repeater may readily be exchanged for a different portion in a very short time without the necessity to adjust the repeater.

What is claimed is:

1. In a device for recording or reproducing signals from tape-like magnetic means,
- the combination comprising,
- a rotatable head wheel operable for carrying at least one magnetic head,
- a stationary part including a flat surface arranged parallel to the plane of rotation of said head wheel,
- locking means secured to said flat surface,
- a repeater for transmitting signals from said magnetic head to said stationary part, said repeater including, a cylindrical portion connected axially to the head wheel, a tubular portion surrounding said cylindrical portion and being journalled thereon, and a support member secured to said tubular portion of said repeater and including a hook-shaped radial extension normally resting on said flat surface and being tiltable in opposite directions for engaging said locking means in the direction of rotation of said head wheel and, respectively, for releasing it.

2. In a device as defined in claim 1 wherein an air bearing is provided between said fixed portion and said rotatable portion.

3. In a device as defined in claim 1 wherein at least a transformer is provided, said transformer including a first coil associated with said tublar portion and a second coil associated with said cylindrical portion, at least one of said coils being exchangeable for another set of coils to provide a different transformer ratio.

4. In a device as defined in claim 1 wherein a different tublar portion of said repeater is provided for recording and for reproducing signals.

* * * * *